(12) United States Patent
Laaser

(10) Patent No.: US 7,286,605 B2
(45) Date of Patent: Oct. 23, 2007

(54) METHOD AND APPARATUS FOR REDUCING A CREST FACTOR OF A MULTI-TONE DATA SIGNAL

(75) Inventor: Peter Laaser, München (DE)

(73) Assignee: Infineon Technologies AG, Munich (DE)

( * ) Notice: Subject to any disclaimer, the term of this patent is extended or adjusted under 35 U.S.C. 154(b) by 662 days.

(21) Appl. No.: 10/674,748

(22) Filed: Sep. 30, 2003

(65) Prior Publication Data

US 2005/0069045 A1 Mar. 31, 2005

(51) Int. Cl.
*H04K 1/10* (2006.01)
(52) U.S. Cl. ..................................... 375/260
(58) Field of Classification Search .............. 375/260, 375/295, 296, 254, 346, 285, 222
See application file for complete search history.

(56) References Cited

U.S. PATENT DOCUMENTS 6,931,079 B1 * 8/2005 Peeters ....................... 375/296
2003/0026331 A1 * 2/2003 Taunton ...................... 375/222

* cited by examiner

*Primary Examiner*—Khai Tran
(74) *Attorney, Agent, or Firm*—Jenkins, Wilson, Taylor & Hunt, P.A.

(57) ABSTRACT

A crest factor reduction circuit for reducing a crest factor (CF) of a multi-tone-data signal which is transmitted in a predetermined transmission frequency band,
wherein the crest factor reduction circuit (8) comprises means (34) for subtracting a multi-tone-correction signal from said multi-tone-data signal,
wherein the multi-tone-correction signal comprises a plurality of tone signals having frequencies outside said transmission frequency band.

42 Claims, 12 Drawing Sheets

METHOD AND APPARATUS FOR REDUCING A CREST FACTOR OF A MULTI-TONE DATA SIGNAL

TECHNICAL FIELD

The invention relates to a method and an apparatus for reducing a crest factor of a multi-tone data signal, and in particular to a transceiver having a crest factor reduction circuit.

BACKGROUND ART

FIG. 1 shows a conventional transceiver according to the state of the art. The transceiver is provided for data transmission with a multi-tone data signal over a wire.

The transceiver comprises a coding unit for generating a multi-tone signal on the basis of a received data bit stream coming from a data source. FIG. 2 shows as an example a diagram for a single tone QAM coding scheme. A data bit sequence of e.g. 2 bits is transformed into a sine carrier with a predetermined amplitude and phase.

The transceiver comprises an inverse fast fourier transformation unit (IFFT) to produce a discrete time domain signal which is converted by a transmission signal path of the transceiver into a continuous time domain signal. The signal transmission path of the transceiver comprises a digital filter, a digital analogue converter, an analogue filter and a driving circuit. The digital and the analogue filter are provided for forming the transmission signal. The driving circuit amplifies the continuous time domain signal which is transmitted over a telephone line to a customer's device.

The transceiver further comprises a reception signal path having an analogue filter, an analogue/digital converter and a digital filter. The analogue filter is provided for limiting the frequency band of the received analogue signal. The digital filter is provided for forming the reception signal. A fast fourier transformation unit is provided for transforming the discrete time domain signal into the frequency domain. A decoding unit derives a bit combination from the amplitude and phase of the different sine carriers and supplies a data bit stream to a data sink. An echo cancellation unit compensates echo signals.

A multi-carrier transmission is composed of a number of independent signals. By using discrete multi-tone transmission (DMT), a transmission data symbol is generated by adding several independent sine carrier signals. FIG. 3 shows a diagram with several sine carriers having different amplitudes and different frequencies. A multi-tone data signal comprises a plurality of tone signals which normally have frequencies which are equidistant to each other. When using DMT, the amplitude and phase of the sinus carriers is kept constant for a symbol time period $$TS_{symbol} = \frac{1}{\Delta f}.$$

As can be seen from FIG. 3, since the data transmission symbol is generated by superimposing different sine carriers, signal peaks can occur.

FIG. 4 shows a transmission time signal of a conventional transceiver with some signal peaks. Signal peaks occur with a probability having a Gaussian distribution as shown in FIG. 5. The signal peaks can exceed the output capabilities of the transceiver, since the driving circuit comes into saturation and the peaks of the transmitted signals are cut off. Saturation causes the transmitted signal to lose a significant amount of information which might be corrected on the receiving side. It is important to reduce the signal peaks of the transmission signal in order to maintain the integrity of the transmitted signal. Accordingly, it is desired to reduce the crest factor of the transmission signal, i.e. the peak to average power ratio of the transmission signal.

SUMMARY OF THE INVENTION

It is the object of the present invention to provide a method and a circuit for reducing the crest factor of a multi-tone data signal without decreasing the transmission capacity provided within the transmission frequency band.

This object is achieved by a method having the features of main claim 1 and by a crest factor reduction circuit having the features of claim 13.

The invention provides a method for reducing a crest factor of a multi-tone data signal which is transmitted in a predetermined transmission frequency band, wherein a multi-tone correction signal is subtracted from said multi-tone data signal, said multi-tone correction signal comprising a plurality of tone signals having frequencies outside said transmission frequency band.

Since the multi-tone correction signal comprises tone signals outside the transmission frequency band, the data transmission capability for the transmission of the data signal is not reduced.

In a preferred embodiment of the method for reducing a crest factor of a multi-tone data signal, the method comprises the following steps:

(a) storing (S1) in a first memory (23) at least one data symbol of a data symbol sequence, each data symbol comprising a predetermined number (N) of data samples s(i) with index i, $0<=i<=(N-1)$, (b) comparing (S3) the amplitude of each data sample of said data symbol with a first threshold value ($TH_A$) to detect a data sample peak;

(c) performing the following steps when a data sample peak is detected:

(c1) reading (S6) a multi-tone-correction signal comprising a corresponding number (N) of correction data samples from a second memory (29);

(c2) shifting (S7) cyclically the read correction data samples of the multi-tone correction signal so that the maximum of said correction data samples coincides with the detected data sample peak;

(c3) scaling (S8) of the shifted correction data samples of the multi-tone-correction signal according to a predetermined spectrum mask;

(c4) accumulating (S9) the scaled correction data samples of the multi-tone-correction signal in a third memory (32);

(d) subtracting (S12) the accumulated correction data samples of the multi-tone-correction signal from the data samples of said data symbol.

In a preferred embodiment, the amplitude of each data sample s(i) of said data symbol is compared with the first threshold value ($TH_A$) and the amplitude of the neighboured data samples s(i−m) and s(i+m) are compared with a second threshold value ($TH_B$), wherein m denotes the modulo N difference of the index of each data sample s(i) and its corresponding neighboured data samples s(i−m) and s(i+m), to detect a data sample peak with a high main and a high side amplitude.

When a data sample peak with a high main and a high side amplitude is detected, at least one single-tone correction signal comprising a tone signal having a frequency within said transmission frequency band is subtracted from said multi-tone data signal.

In a preferred embodiment, the amplitude of each data sample s(i) of said data symbol is compared with a third threshold value ($TH_C$) and the amplitude of the neighboured data samples s(i−m) and s(i+m) are compared with the second threshold value ($TH_B$), to detect a data sample peak with a very high main and high side amplitdes.

When a data sample peak with a very high main and a high side amplitude is detected, the multi-tone correction signal comprising a plurality of tone signals having frequencies outside said transmission frequency band and at least one additional signal tone correction signal comprising a tone signal having a frequency within said transmission frequency band are subtracted from said multi-tone data signal.

In other preferred embodiments, the threshold values are adjustable.

In a preferred embodiment, the multi-tone data signal comprises a plurality of tone signals having frequencies which are equidistant.

In a preferred embodiment, the multi-tone data signal is an ADSL signal.

The invention further provides a crest factor reduction circuit for reducing a crest factor (CF) of a multi-tone data signal which is transmitted in a predetermined transmission frequency band, wherein the crest factor reduction circuit comprises means for subtracting a multi-tone correction signal from said multi-tone data signal, wherein the multi-tone correction signal comprises a plurality of tone signals having frequencies outside said transmission frequency band.

In a preferred embodiment, the crest factor reduction circuit has a data input for receiving a data symbol sequence of a data transmission signal.

In a preferred embodiment, the crest factor reduction circuit has a first memory for storing at least one data symbol of the received data symbol sequence, wherein each data symbol comprises a predetermined number (N) of data samples.

In a preferred embodiment, the crest factor reduction circuit comprises a first comparator for comparing the amplitudes of each data sample s(i) of the stored data symbol with a first threshold value to detect a data sample peak.

In a preferred embodiment the crest factor reduction circuit comprises a counter modulo N which controls a multiplexer for switching sequentially the data samples to the first comparator.

In a preferred embodiment the crest factor reduction circuit comprises a second memory for storing at least one multi-tone correction signal which comprises correction data samples, wherein the number (N) of correction data samples corresponds to the number of data samples of a data symbol.

In a preferred embodiment of the crest factor reduction circuit a shifting unit is provided for shifting the correction data samples which are read from said second memory so that the maximum of the correction data samples coincides with the detected sample peak.

In a preferred embodiment the crest factor reduction circuit further comprises a scaling unit for setting the sign and scaling the shifted correction data samples according to a predetermined spectrum mask.

In a preferred embodiment of the crest factor reduction circuit an accumulating unit is provided for accumulating the scale correction data samples in a third memory.

In a preferred embodiment of the crest factor reduction circuit a subtractor is provided for subtracting the accumulated correction data samples from said data samples of the received data symbol.

In a preferred embodiment the crest factor reduction circuit comprises a delay unit for delaying the received data samples with a predetermined delay time.

In a preferred embodiment of the crest factor reduction circuit the third memory is reset by an overflow signal generated by said modulo-N-counter.

In a preferred embodiment the crest factor reduction circuit comprises a data output for outputting the corrected data samples as a sequence of corrected data symbols each comprising a predetermined number of corrected data samples.

In a preferred embodiment the crest factor reduction circuit is connected to a transmission signal path comprising a digital filter for forming a digital transmission signal,
a digital analogue converter for converting the digital transmission signal into an analogue transmission signal,
an analogue filter for forming the analogue transmission signal, and
a line driver for amplifying the analogue transmission signal.

In a preferred embodiment the crest factor reduction circuit comprises a convoluting unit for convoluting the received data samples with the impulse response of the transmission signal path.

In a preferred embodiment the crest factor reduction circuit comprises the first comparator for comparing the amplitudes of each data sample s(i) with the first threshold value and a second comparator for comparing the amplitudes of the neighboured data samples s(i−m) and s(i+m) of each data sample s(i) of the stored data symbol with a second threshold value to detect a data sample peak with a high main and a high side amplitude.

In a preferred embodiment the crest factor reduction circuit comprises a third comparator for comparing the amplitudes of each data sample s(i) with the third threshold value and the second comparator for comparing the amplitudes of the neighboured data samples s(i−m) and s(i+m) of each data sample s(i) of the stored data symbol with the second threshold value to detect a data sample peak with a very high main and a high side amplitude.

In a preferred embodiment of the crest factor reduction circuit at least one single-tone correction signal is additionally stored in the second memory wherein the single tone correction signal comprises a tone signal having a frequency within the transmission frequency band.

In a preferred embodiment the single-tone correction signal is read from said second memory and supplied to the shifting unit when the first comparator and the second comparator detect a data sample peak with a high main and a high side amplitude.

In a preferred embodiment of the crest factor reduction circuit the multi-tone correction signal and the single-tone correction signal are read from said second memory and supplied to the shifting unit when the first comparator and third comparator detect a data sample peak with a very high main and a high side amplitude.

In a preferred embodiment, the first memory is a random access memory (RAM).

In a preferred embodiment of the crest factor reduction circuit, the second memory is a random access memory (RAM).

In a preferred embodiment of the crest factor reduction circuit, the third memory is a random access memory (RAM).

The invention further provides a transceiver for transceiving a data signal comprising
a coding unit for generating a multi-tone signal from a received data bit stream,
a IFFT unit for performing an inverse fast fourier transformation of the multi-tone signal to generate a multi-tone data signal comprising a sequence of data symbols wherein each data symbol has a predetermined number (N) of data samples,
a crest factor reduction circuit for reducing a crest factor of the multi-tone data signal which is transmitted in a predetermined transmission frequency band,
wherein the crest factor reduction circuit comprises means for subtracting a multi-tone correction signal from said multi-tone data signal,
wherein the multi-tone correction signal comprises a plurality of tone signals having frequencies outside said transmission frequency band, and
a transmission signal path for forming an analogue transmission signal from the corrected multi-tone data signal.

In a preferred embodiment the transmission signal path of the transceiver comprises a digital filter for forming a digital data transmission signal,
a digital analogue converter for converting the output signal of the digital filter into an analogue signal, an analogue filter for forming an analogue transmission signal, and
a driving circuit for amplifying the analogue transmission signal.

In a preferred embodiment the transceiver comprises a reception signal path.

In a preferred embodiment the reception signal path of the transceiver comprises an analogue filter for limiting the frequency band of a received analogue signal,
an analogue digital converter for converting the received analogue signal into a digital signal, and a digital filter for forming the received converted digital signal.

In a preferred embodiment the transceiver according to the present invention comprises an echo cancellation unit for compensating echo signals.

In a preferred embodiment the transceiver comprises a subtractor for subtracting the output signal of the echo compensating unit from the output signal of the reception signal path.

In a preferred embodiment a FFT unit is provided for performing a fast fourier transformation of the output signal of the subtractor.

In a preferred embodiment the transceiver according to the present invention comprises a decoding unit which is connected to the FFT unit for performing a demodulation of the multi-tone signal.

In a preferred embodiment the transceiver according to the present invention comprises a hybrid circuit which is connected to the output of the transmission signal path and to the input of the reception signal path.

In a preferred embodiment the transceiver according to the present invention is an ADSL transceiver.

In the following preferred embodiments of the method and circuit for a crest factor reduction are explained in detail with reference to the enclosed Figures.

DETAILED DESCRIPTION OF THE INVENTION

Figure 6:
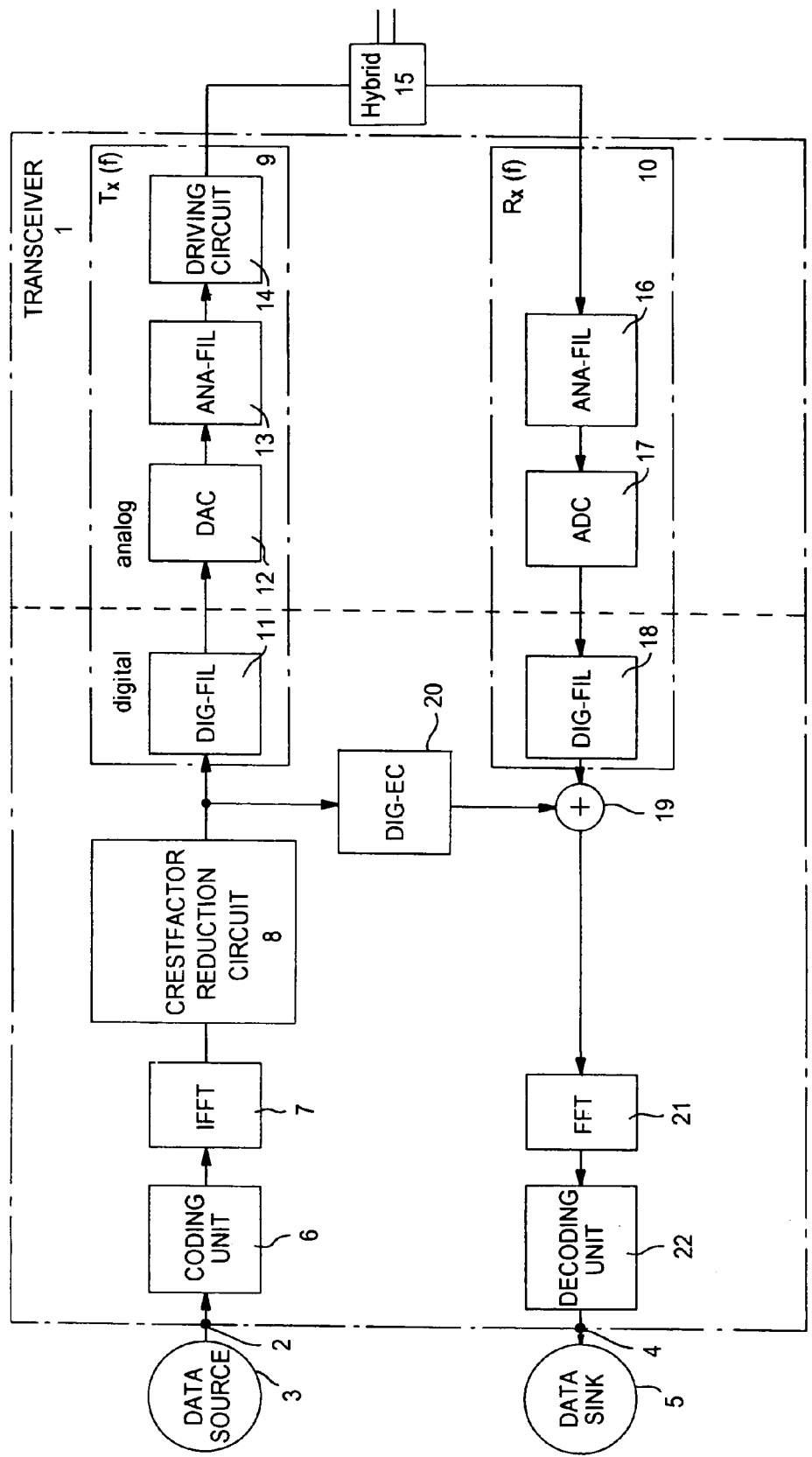
FIG. 6 shows a block diagram of a transceiver according to the present invention.

As can be seen from FIG. 6, the transceiver 1 according to the present invention has a data input 2 for receiving a continuous data bit stream from a data source 3. The transceiver further comprises a data output 4 for supplying a continuous data bit stream to a data sink 5.

Figure 1:
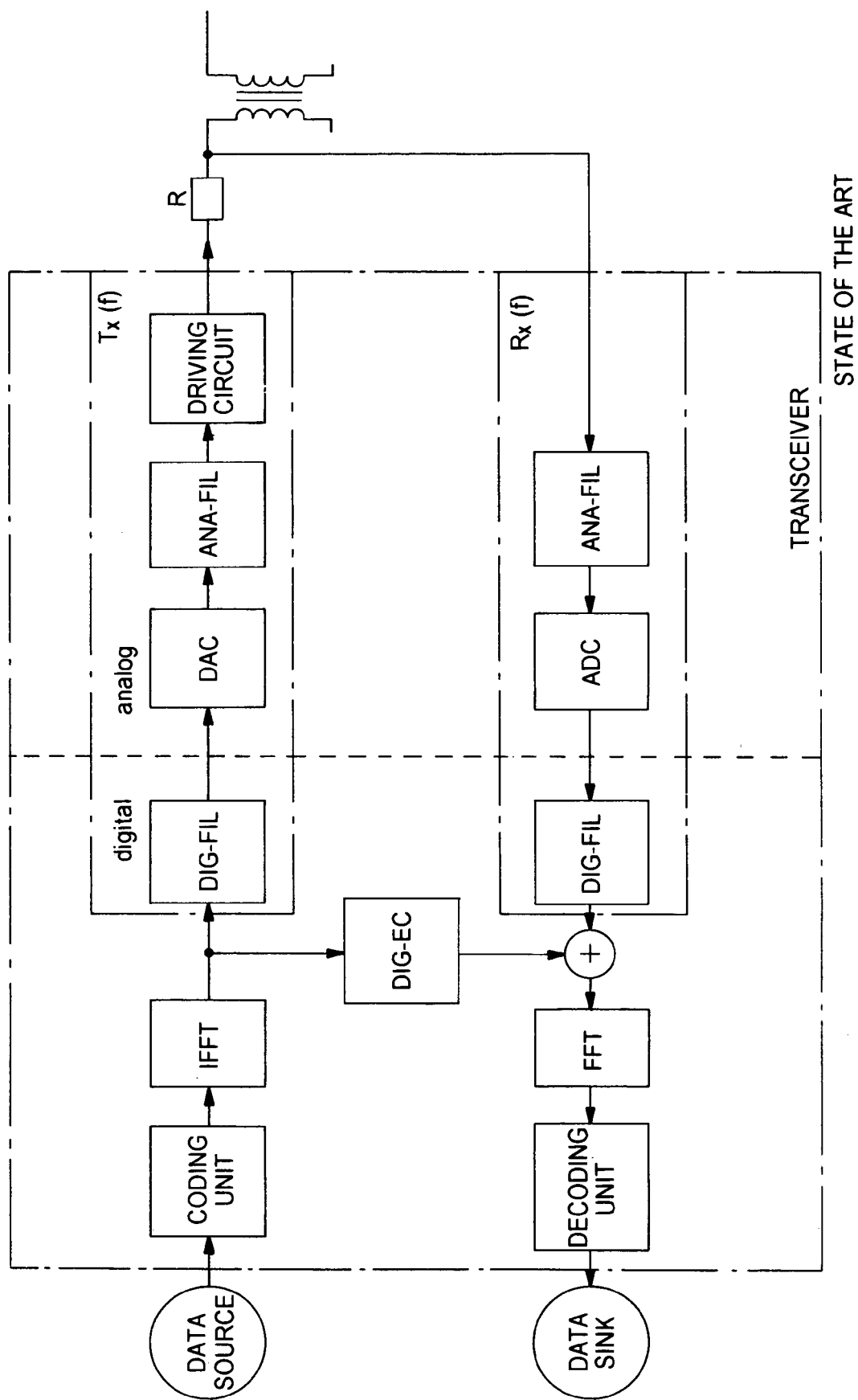
FIG. 1 shows a conventional transceiver according to the state of the art.
Figure 2:
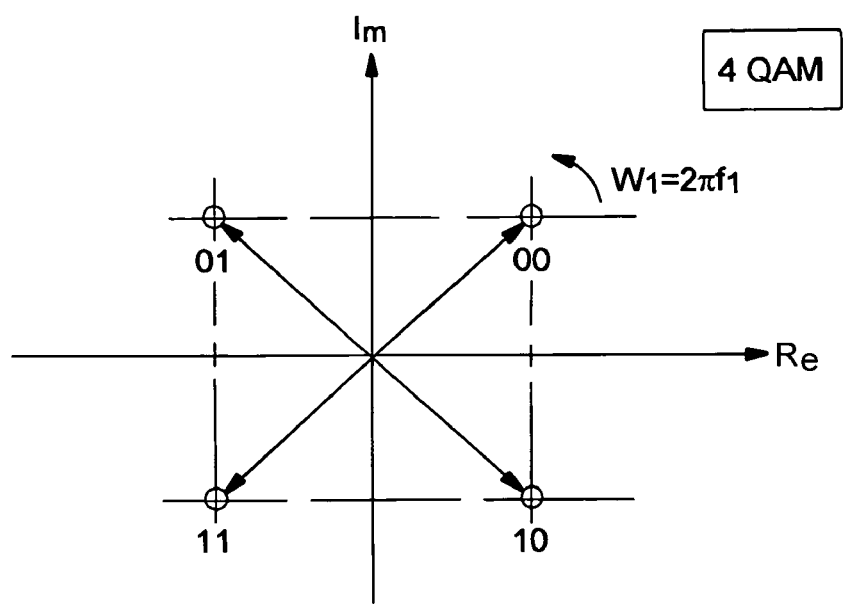
FIG. 2 shows a diagram for explaining a single-tone QAM modulation scheme.
Figure 3:
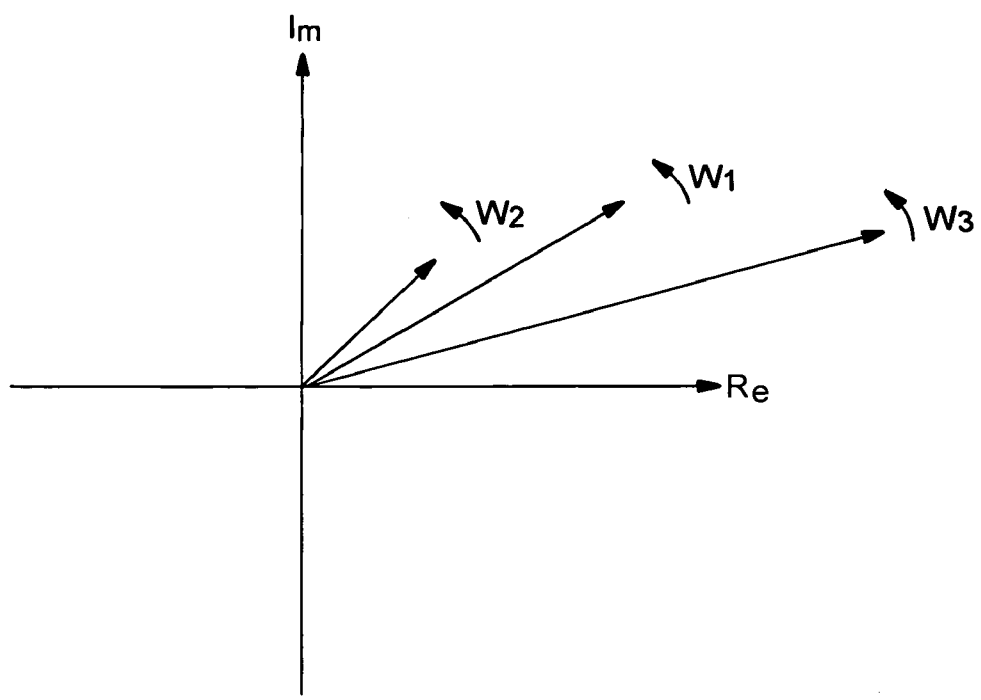
FIG. 3 shows a further diagram of a multi-tone modulation scheme.
Figure 4:
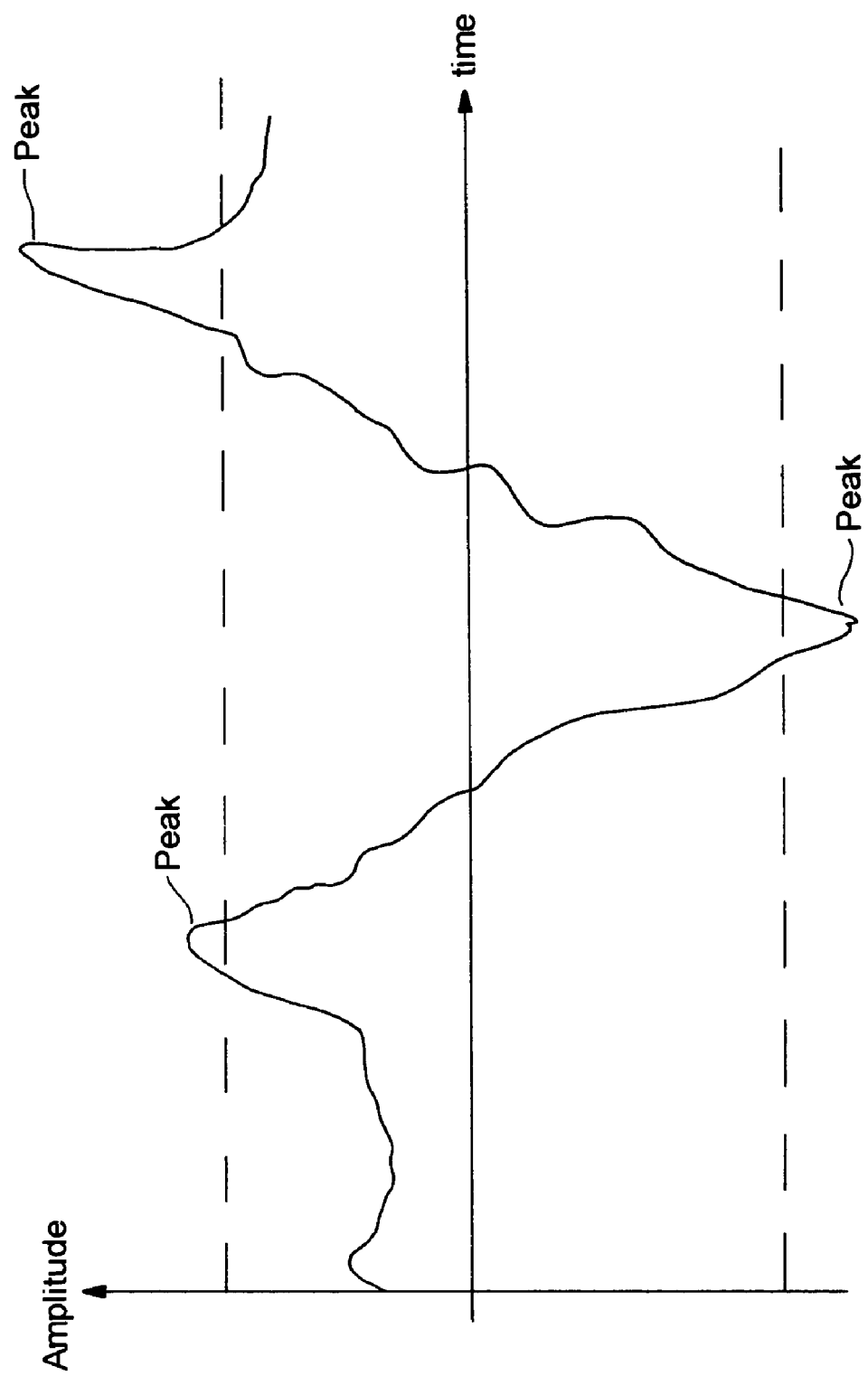
FIG. 4 shows a continuous time transmission signal having signal peaks.
Figure 5:
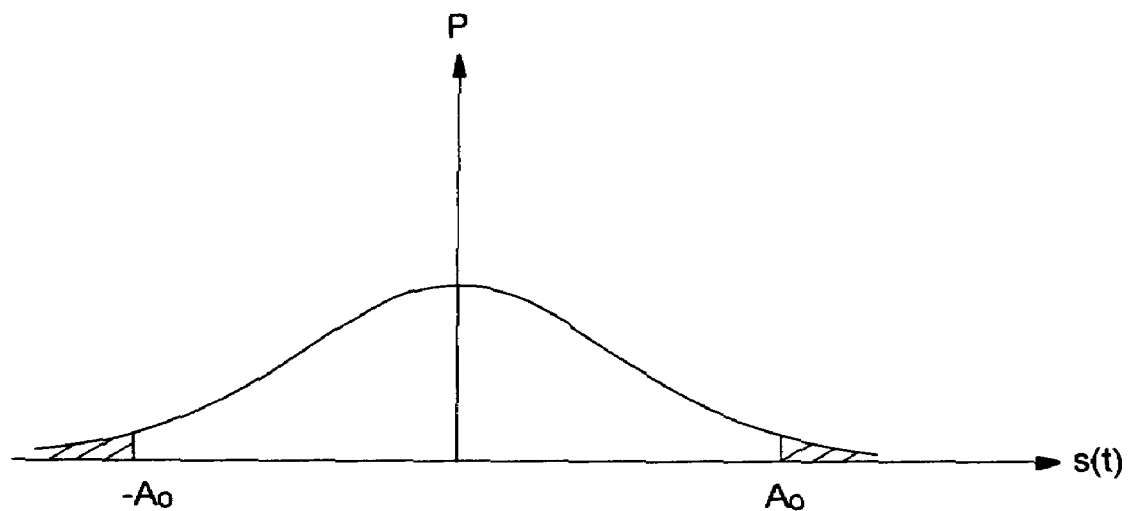
FIG. 5 shows a diagram explaining the probability of the occurrence of data signal peaks.

A coding unit 6 generates a multi-tone signal on the basis of the received data bit stream as explained in connection with FIG. 2. The transceiver further comprises an IFFT unit for performing an inverse fast fourier transformation of the multitone signal to generate a multitone data signal. The multi-tone data signal comprises a sequence of data symbols each having a predetermined number (N) of data samples.

The transceiver 1 according to the present invention further comprises a crest factor reduction circuit 8 which is provided for reducing the crest factor of the multitone data signal. The multitone data signal is transmitted in a predetermined transmission frequency band ΔF. The crest factor reduction circuit 8 has means for subtracting a multi-tone correction signal from the multi-tone data signal which is supplied from the IFFT unit 7 to the crest factor reduction circuit 8. The multi-tone correction signal used by the crest factor reduction circuit 8 comprises a plurality of tone signals having frequencies outside the transmission frequency band ΔF of the multi-tone data signal.

The transceiver 1 has a transmission signal path 9 and a reception signal path 10. The transmission signal path 9 of the transceiver 1 comprises a digital filter 11 which is provided for forming a digital data transmission signal. The output of the digital filter 11 is connected to a digital analogue converter 12 which converts the digital signal into an analogue signal. Further, an analogue filter 13 is provided for forming an analogue transmission signal. The output of the analogue filter 13 is connected to a driving circuit 14 which amplifies the analogue transmission signal. The output of the transmission signal path 9 is connected to a hybrid circuit 15.

The reception signal path 10 of the transceiver 1 includes an analogue filter 16, an analogue digital converter 17 and a digital filter 18. The analogue filter 16 is provided for limiting the frequency band of the received analogue signal. The digital filter 18 forms the received converted digital signal and supplies this signal to a subtractor 19. The subtractor 19 subtracts from the received digital signal the output signal of an echo cancellation unit 20 for compensating echo signals. The output of the subtractor 19 is connected to an FFT unit 21 which performs a fast fourier transformation of the output signal of the subtractor 19. Further, a decoding unit 23 is connected to the FFT unit 21, wherein the decoding unit performs a demodulation of the multi-tone signal.

Figure 7:
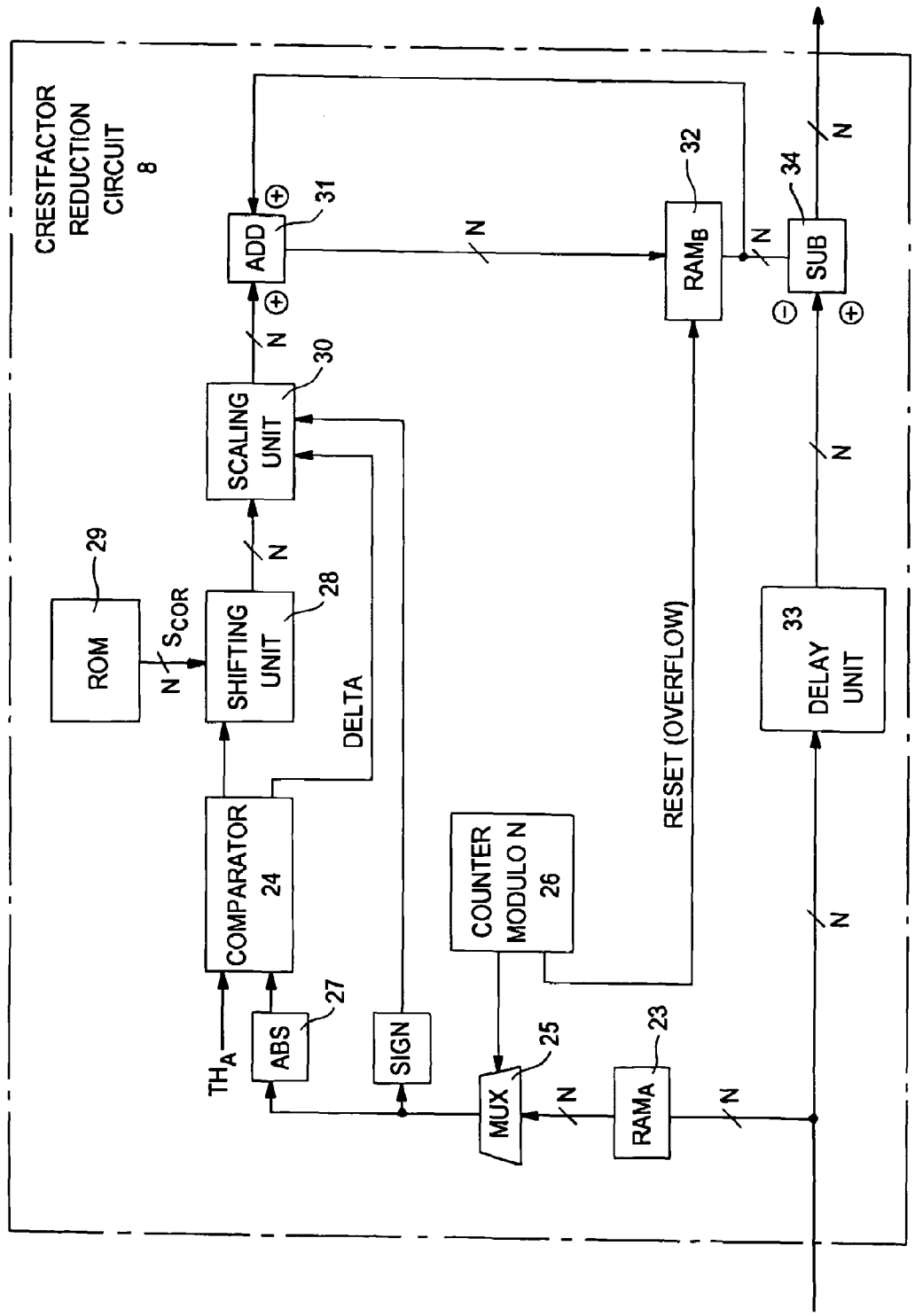
FIG. 7 shows a block diagram of a first embodiment of the crest factor reduction circuit according to the present invention.

FIG. 7 shows a block diagram of a first embodiment of the crest factor reduction circuit 8 according to the present invention. The crest factor reduction circuit 8 is provided for reducing the crest factor of the multi-tone data signal supplied by the IFFT unit 7, wherein the multi-tone data signal is transmitted within a predetermined transmission frequency band $\Delta F$. The crest factor reduction circuit 8 comprises a first memory 23 which is in a preferred embodiment a random access memory RAM. The first memory 23 of the crest factor reduction circuit 8 is provided for storing at least one data symbol supplied by the IFFT unit 7 wherein each data symbol has a predetermined number (N) of data samples s(i). In a typical embodiment, the number (N) of data samples is 64. The data samples of the stored data symbol are supplied to a comparator 24 via a multiplexer 25 which is controlled by a modulo-N-counter 26. The comparator 24 compares the amplitudes of each data sample of the data symbol stored in memory 23 with a first threshold value $TH_A$ to detect a data sample peak. The data samples of the data symbol are sequentially switched by the multiplexer to a unit 27 which generates the absolute value of the data sample, i.e. the amplitude of the data sample. This amplitude is compared by the comparator 24 with the threshold value $TH_A$. In a preferred embodiment, the threshold value $TH_A$ is adjustable. The comparator unit 24 calculates the difference between the amplitude of the data sample and the threshold value $TH_A$ and provides the calculated difference DELTA and the sign of the data sample s(i) to a scaling unit 30. The comparator 24 controls a shifting unit 28. The crest factor reduction circuit 8 comprises a second memory 29 in which at least one multi-tone correction signal is stored. The multi-tone correction signal $s_{cor}$ comprises correction data samples wherein the number (N) of correction data samples is equal to the number of data samples of a data symbol stored in the first memory 23.

The correction signal $S_{cor}$ comprises several sine signal carriers outside the transmission frequency band of the multi-tone data signal.

$$s_{COR} = \sum_k S_{COR_K} e^{j\frac{2\Pi k \cdot n}{N}} \quad (1)$$

wherein

N=number of data samples of a data symbol $S_{COR_K}$=Sine signal carrier

Figure 10:
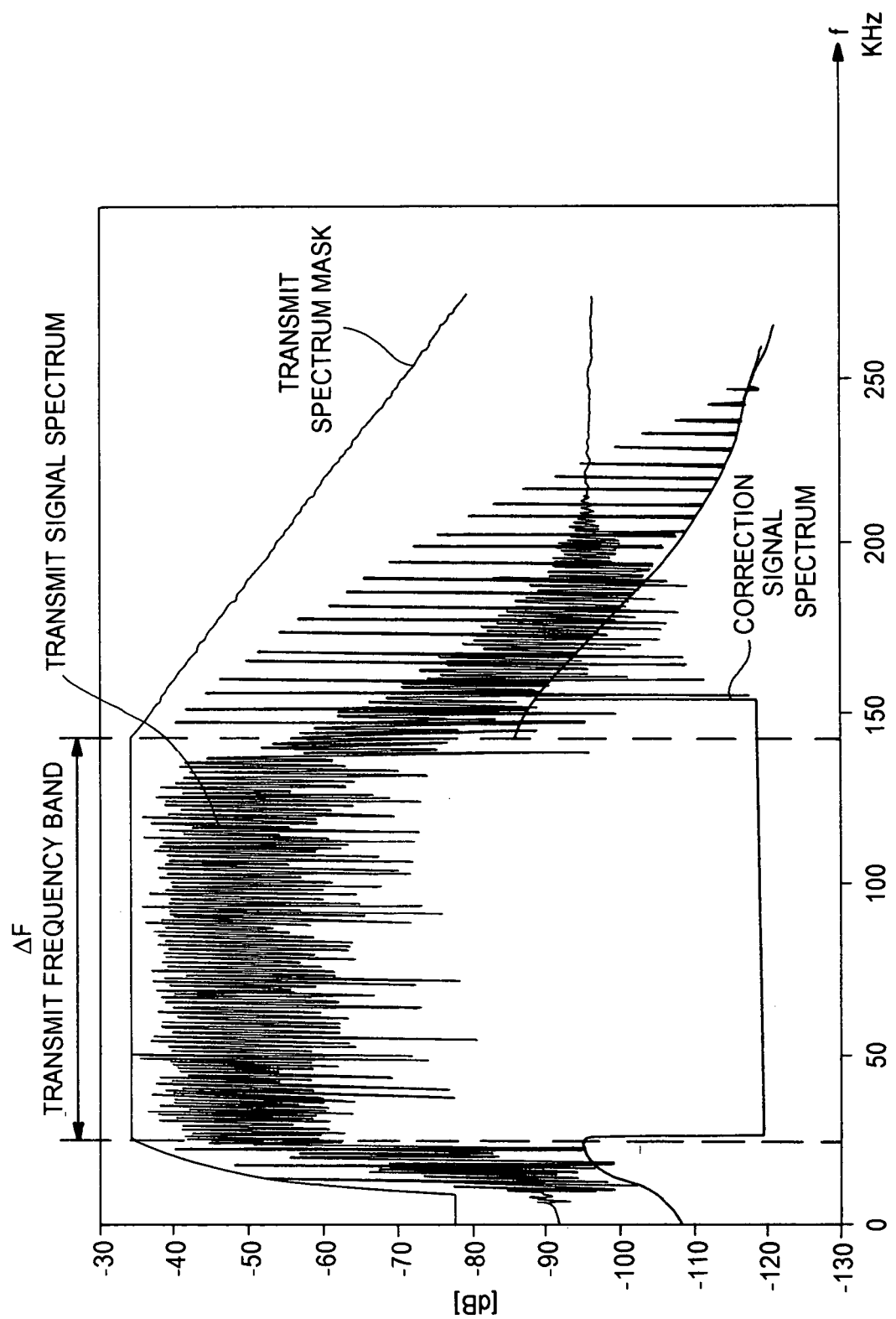
FIG. 10 shows a frequency spectrum for a correction signal according to the present invention.

FIG. 10 shows the signal spectrum of a correction signal $S_{cor}$ in a preferred embodiment. In this embodiment, the crest factor reduction circuit 8 is provided within an ADSL transceiver 1 (ADSL=Asymmetrical Digital Subscriber Line). The multi-tone data signal is transmitted within the ADSL transmission frequency band $\Delta F$, wherein the data transmission sine carriers 6-31 are used. The sine carriers have a constant frequency $\Delta f$=4,3125 kHz. Accordingly, the 6th sine carrier has a frequency of 25,875 kHz and the 31$^{st}$ carrier frequency is 133,6875 kHz. The data signal is formed by means of a discrete multi-tone transmission method superimposing the 25 sine carrier signals having a constant frequency difference of $\Delta f$=4,3125 kHz. Because of the time limitation of the transmission data symbol $$T_{symbol} = \frac{1}{\Delta f} \approx 232 \, ms$$

the data signal spectrum has spectral signal portions at the borders of the transmission frequency band $\Delta F$ as can be seen in FIG. 10.

The crest factor reduction circuit 8 within the ADSL transceiver 1 subtracts from the multi-tone data signal a multi-tone correction signal comprising a plurality of tone signals having frequencies outside the transmission frequency band, i.e. lower than the frequency of the 6$^{th}$ sine tone data carrier and higher than the frequency of the 31$^{st}$ sine tone data carrier. When the comparator 24 detects that a signal peak has occurred, i.e. a data sample of the stored data symbol has an amplitude which is higher than the adjustable threshold value $TH_A$, it controls the shifting unit 28 to read the corresponding number of correction data samples from the second memory 29.

In a typical embodiment N=64, the correction data samples are read from the second memory 29 and loaded into the shifting unit 28. The shifting unit 28 shifts the read correction data samples of the multi-tone correction signal cyclically so that the maximum of the correction data samples coincides with the detected data sample peak.

As can be seen from FIG. 10 in a preferred embodiment, the correction signal spectrum comprises carrier frequencies 2-5 and 32-64, i.e. with reference to equation (1) k=2-5, 32-64.

The shifted correction data samples are supplied to a scaling unit and perform a scaling of the samples according to the predetermined ADSL spectrum mask.

$$SKF = \frac{DELTA \cdot SIGN \cdot (data\_sample)}{Max\{s_{COR_N}\}} \cdot F \quad (2)$$

wherein

DELTA=difference between amplitude of data sample and treshold value TH

F=constant$\geq 1$

The output of the scaling unit 30 is connected to an adder 31 which accumulates the scaled correction data samples of the multi-tone correction signal in a third memory 32. In a preferred embodiment the third memory 32 is a random access memory RAM. The data content of the third memory 32 is reset by the overflow signal of the modulo-N-counter 26.

The received data samples of a data symbol are delayed by a delay unit 32. The data samples are corrected by subtracting the accumulated correction data samples stored in the third memory 32 from the data samples by means of a subtractor 34.

In the first embodiment shown in FIG. 7, the correction signal $S_{COR}$ can be described as:

$$s_{COR_n} = \sum_{\substack{k=2-5 \\ 32-64}} F(k)H(f)e^{j2\Pi\frac{k \cdot n}{N}} \quad (3)$$

wherein
F(k) is a scaling factor F(k)>1
H(f) is spectrum mask
N is the number of corection data samples N=64

Figure 8:
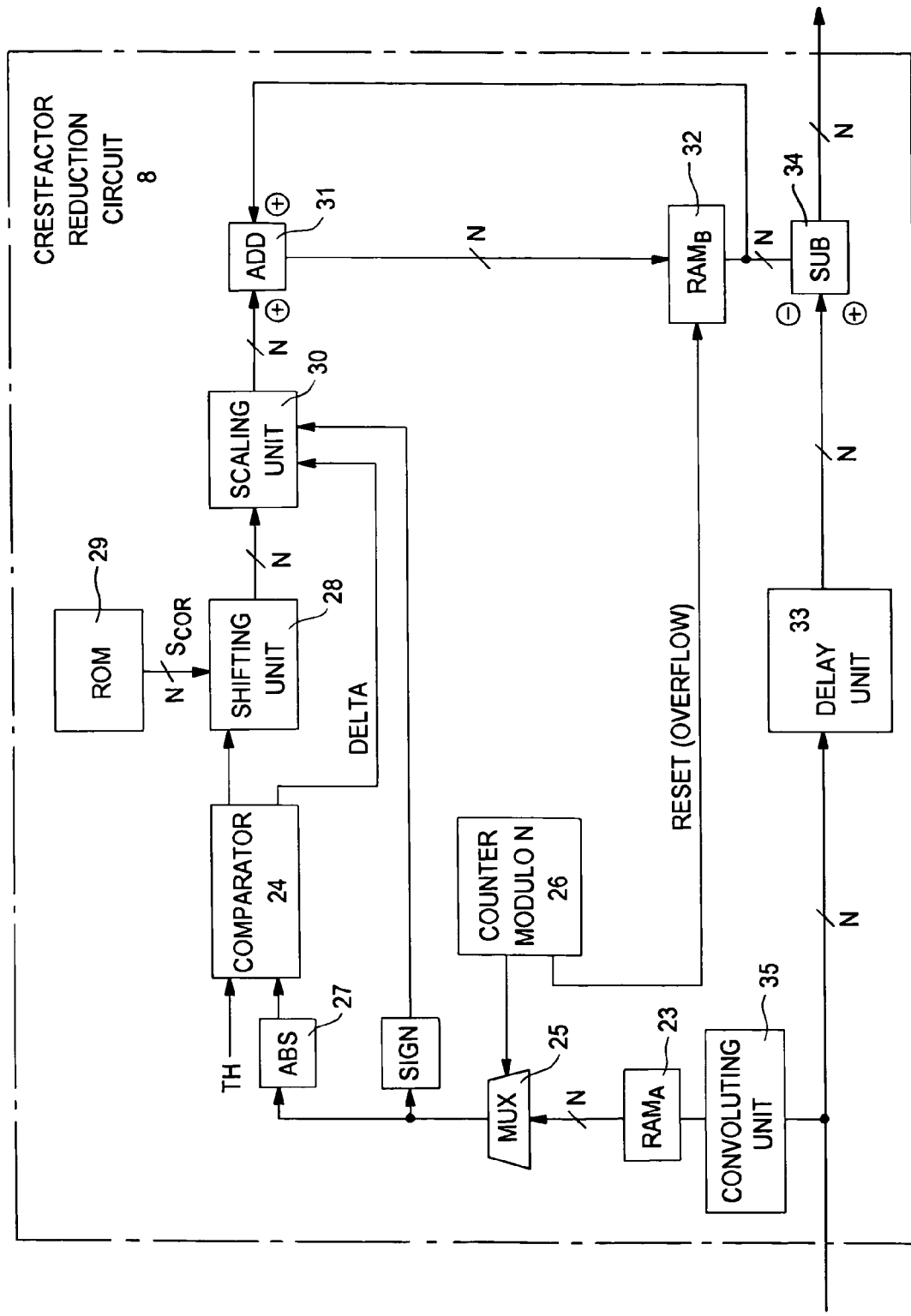
FIG. 8 shows a block diagram of a second embodiment of the crest factor reduction circuit according to the present invention.

In the second embodiment of the crest factor reduction circuit 8 according to the present invention as shown in FIG. 8, a programmable convoluting unit 35 is provided for convoluting the received data samples with the impulse response Tx(f) of the transmission signal path 9.

In this embodiment, the correction signal stored in the read-only memory 29 can be described as:

$$s_{COR_n} = \sum_{\substack{k=2-5 \\ 32-64}} F(k)\frac{H(f)}{Tx(f)}e^{j2\Pi\frac{k \cdot n}{N}} \quad (4)$$

wherein
Tx(f) is the impulse response of the transmission signal path 9
Tx(f) can either be predetermined or is estimated or calculated during the initialization phase of the transmitter.

Figure 9:
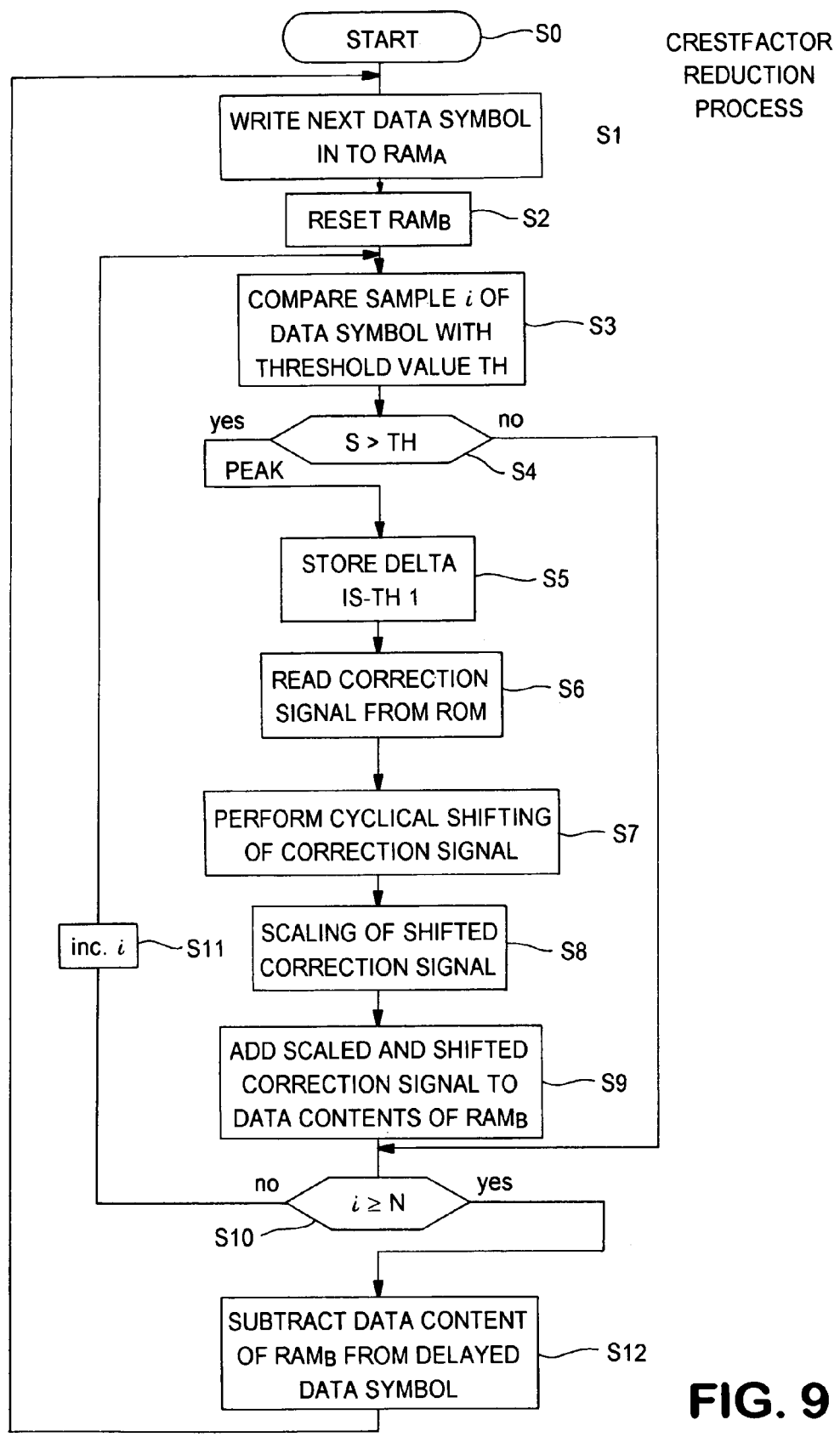
FIG. 9 shows a flow chart of a preferred embodiment of the method for reducing a crest factor according to the present invention.

FIG. 9 shows a flow chart of the crest factor reduction method according to the present invention. After the start in step S0, the next data symbol comprising a predetermined number (N) of correction data samples is stored in the first memory 23 of the crest factor reduction circuit 8.

In the next step S2, the third memory 32 is reset by the modulo-N-counter 26. The data symbol stored in the first memory 23 comprises e.g. 64 data samples. The modulo-N-counter counts cyclically from 1 to 64 and controls the multiplexer 25. Consequently, the stored data samples are sequentially supplied to the unit 27 which applies the absolute value of each data sample to comparator 24.

In a step S3, comparator 24 compares the applied data sample with the adjusted threshold value $TH_A$.

In a step S4, it is checked whether the data sample has an amplitude which is higher than the adjusted threshold value $TH_A$. If the data sample has an amplitude which is higher than the threshold value $TH_A$, a signal peak is detected, and the comparator stores in step S5 the difference between the amplitude of the data sample and the threshold value.

In a step S6, a correction signal stored in the read-only memory 29 is loaded into the shifting unit 28.

In a step S7, the shifting unit 28 shifts cyclically the read correction data samples of the multi-tone correction signal until the maximum of the correction data samples coincides with the detected data sample peak.

After the performance of the shifting, the shifted correction data samples of the multi-tone correction signal is scaled by the scaling unit 30 in step S8.

In a step S9, the scaled and shifted correction data samples of the multi-tone correction signal are accumulated in the third memory 32.

In step S10, it is checked whether all N data samples of a data symbol have been supplied to the comparator 24.

In step S11, the counter is incremented, and the process returns to step S3. If all data samples have been supplied to the comparator 24, the accumulated data samples stored in the third memory 32 are subtracted by substractor from the delayed data symbol in step S12. Then the process returns to step S1.

Figure 11:
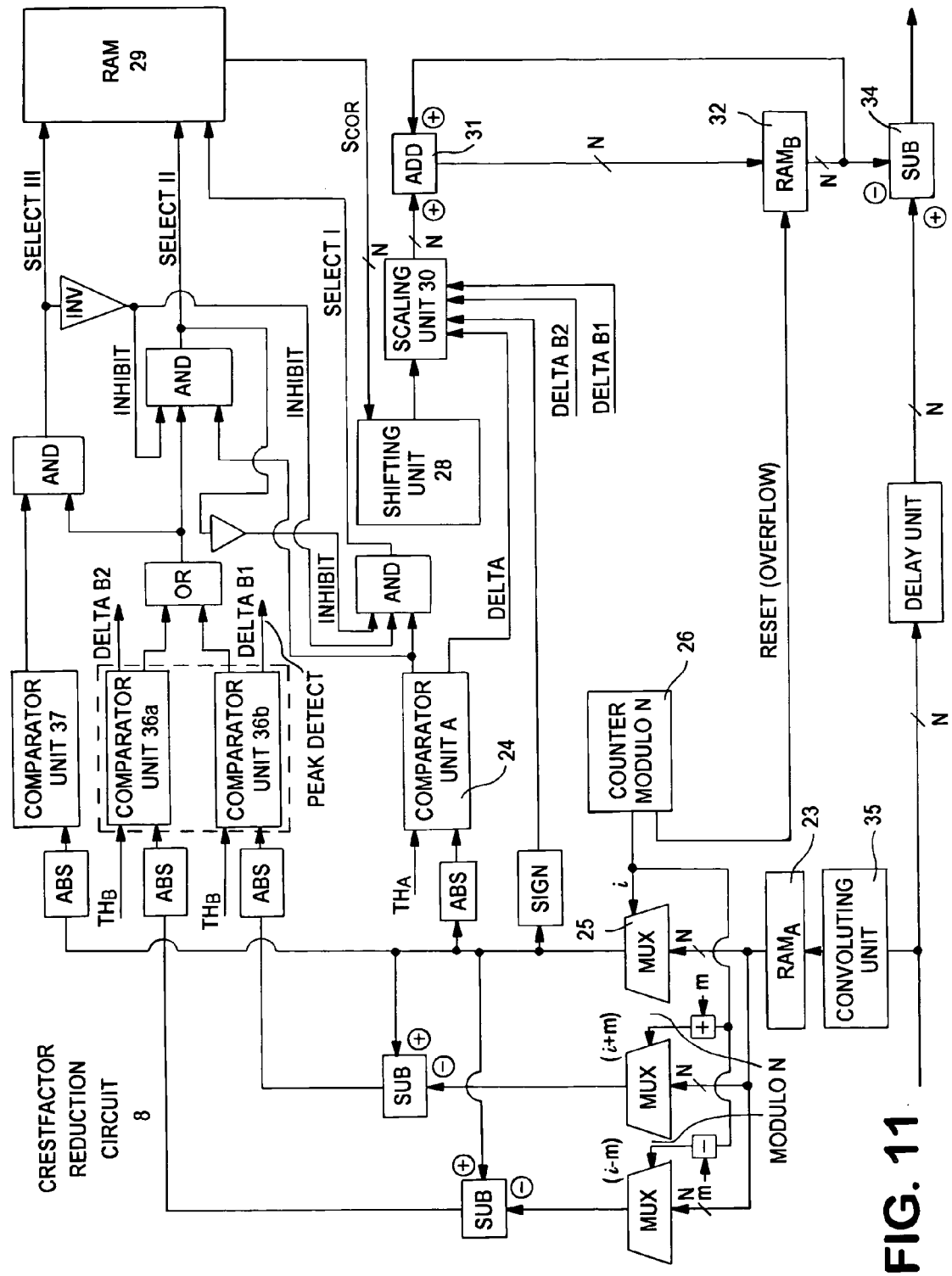
FIG. 11 shows a block diagram of a third embodiment of the crest factor reduction circuit according to the present invention.

FIG. 11 shows a third embodiment of the crest factor reduction circuit 8 according to the present invention.

In this embodiment, a second single-tone correction signal comprising a tone signal having a frequency within the transmission frequency band ΔF is stored in the read-only memory 29 in addition to the first multi-tone correction signal comprising a plurality of tone signals having frequencies outside said transmission frequency band ΔF.

The correction signal can be described as:

$$s_{COR_n} = \sum_{\substack{k=2-5 \\ 32-64}} F(k)\frac{H(f)}{Tx(f)}e^{j2\Pi\frac{k \cdot n}{N}} + F(c)\frac{H(f)}{Tx(f)}e^{j2\Pi\frac{c \cdot n}{N}} \quad (5)$$

wherein
$6 \leq c \leq 31$

The second correction signal is a single-tone correction signal comprising a tone signal having a frequency within the transmission frequency band. When the transceiver 1 is an ADSL transceiver, the carrier frequency might be the 6 to 31 carrier frequency. In a preferred embodiment, the carrier frequency of the second correction signal is the $18^{th}$ carrier frequency.

$$f_{18} = 18 \cdot 4{,}3125 \text{ kHz} \sim \frac{1}{2} \cdot (f_5) + (f_{32})$$

If the data sample has an amplitude which is higher than the threshold value $TH_A$ of the first comparator 24, the crest factor reduction circuit 8 according to the third embodiment as shown in FIG. 11 works in the same way as in the other two embodiments shown in FIGS. 7, 8. If the amplitude of the data sample s(i) is higher than a third threshold value $TH_A$ and the neighboured data samples s(i−m) or s(i+m) are even higher than the second threshold value $TH_B$, as detected by comparator units 36a, 36b a second single-tone correction signal is selected from the memory 29. Accordingly, when the comparator units 36a, 36b detect a data sample peak with a high main and a high side amplitude. Not the first multi-tone correction signal having tone signals with frequencies outside the transmission frequency band ΔF, but at least one single-tone correction signal having a tone signal with a frequency within the transmission frequency band ΔF is selected from the random access memory 29 and supplied to the shifting unit 28 to compensate such a high amplitude. If in rare cases, the amplitude of the data sample s(i) is even higher than a third threshold value $TH_C$ and the neighboured data samples s(i−m) or s(i+m) are higher than the second threshold value $TH_B$, whereas m is denotes the modulo N difference of the index of the data sample s(i) and its corresponding neighboured data samples s(i−m) and s(i+m), third comparator unit 37 selects both correction signals from the random-access memory 29, i.e. at least one single-tone correction signal comprising a tone signal having a frequency within said transmission frequency band ΔF and a multi-tone correction signal comprising a plurality of tone signals having frequencies outside the transmission frequency band. In this case, the strongest possible compensation is performed by the crest factor reduction circuit 8.

Figure 12:
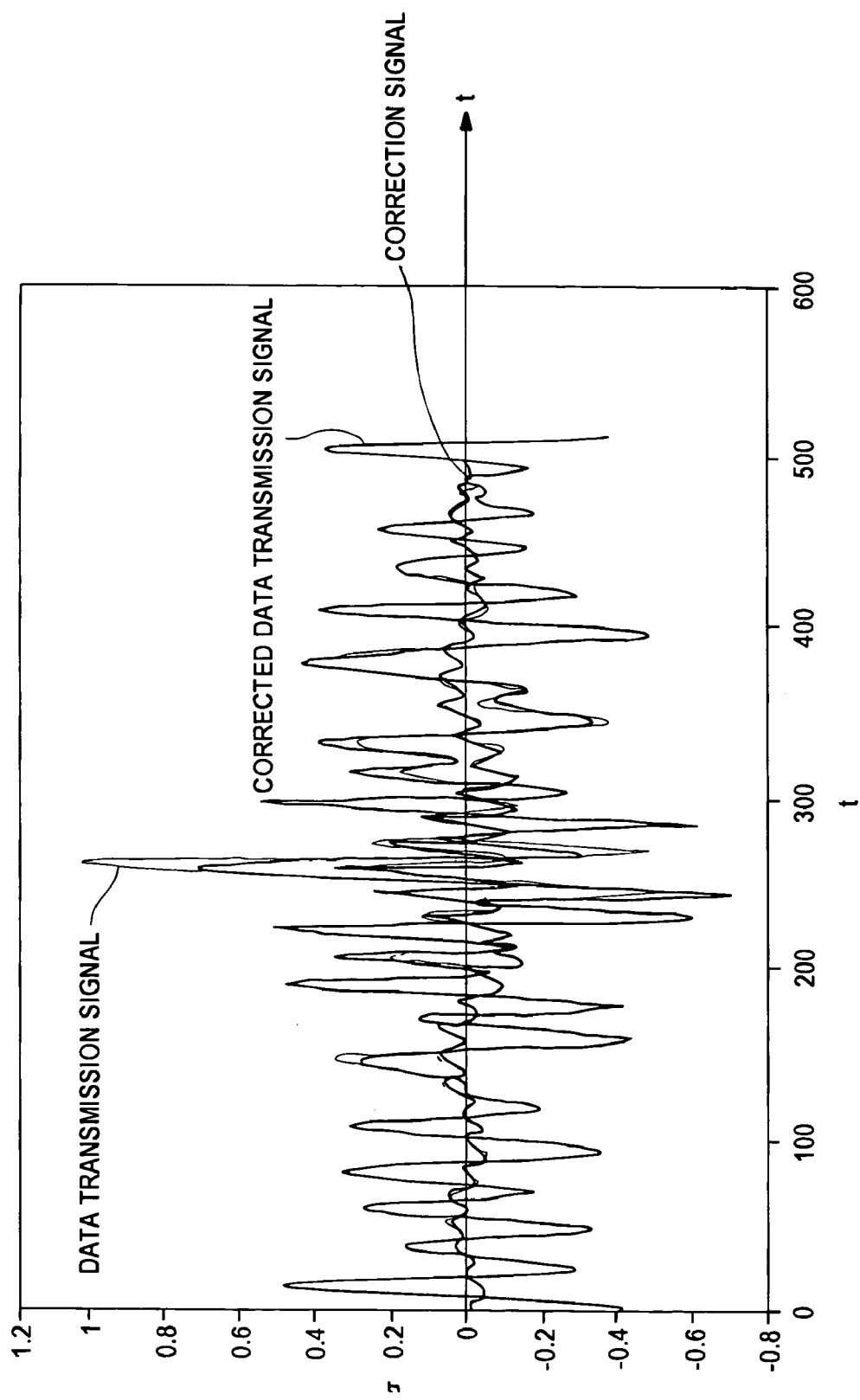
FIG. 12 shows a diagram of a correction signal generated by the crest factor reduction circuit according to the present invention.

FIG. 12 shows a transmission signal having a high crest factor according to the ADSL standard. Further, a multi-tone correction signal is shown which is composed of sine tone carriers having frequencies outside the ADSL transmission frequency band. The multi-tone correction signal is subtracted from the multi-tone data signal, i.e. from the transmission signal. FIG. 12 shows the corrected data transmission signal having reduced signal peaks and consequently a smaller crest factor. Since the sine tone carriers of the correction signal are outside of the data transmission frequency band ΔF, no reduction of the data rate occurs.

Figure 13:
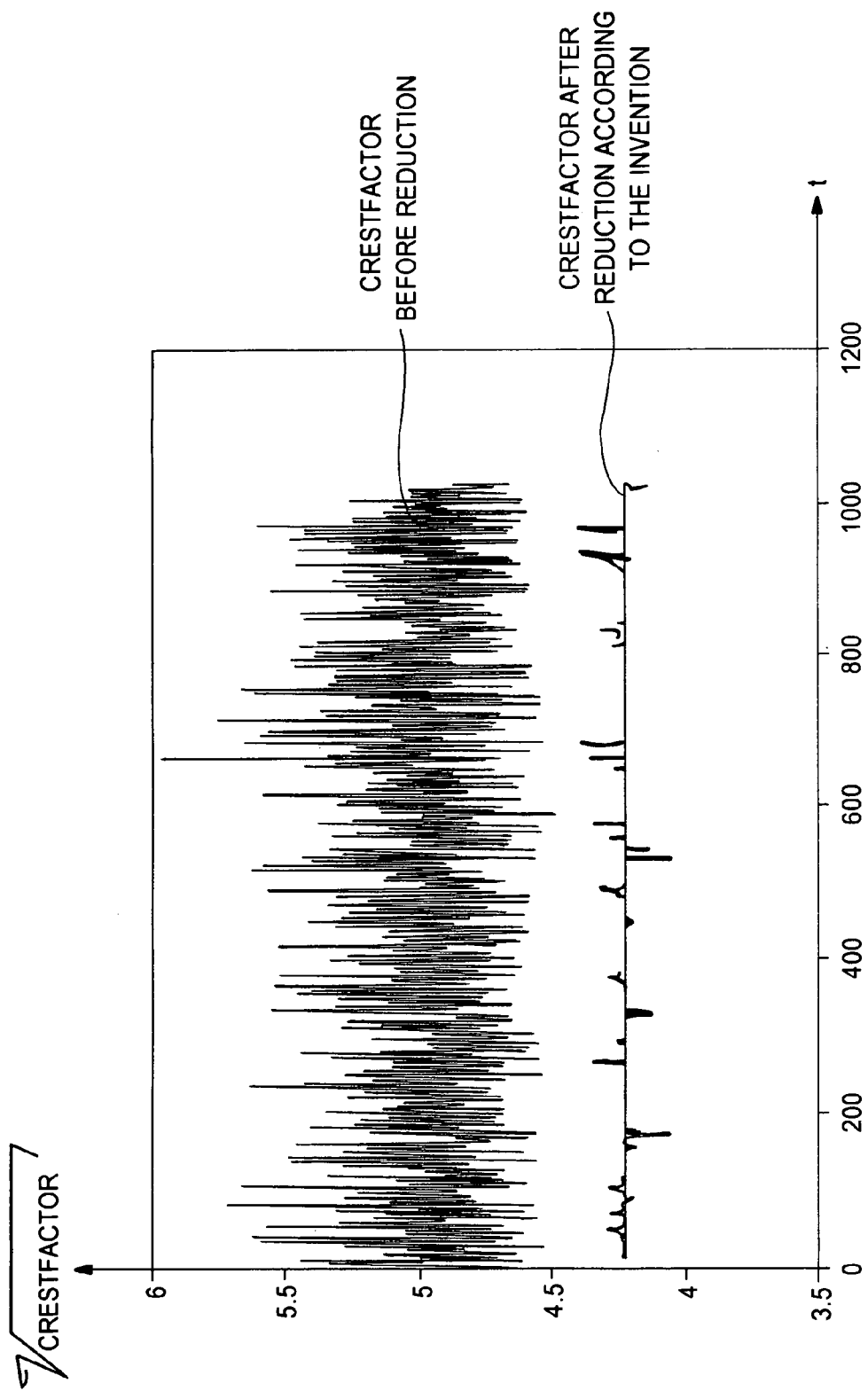
FIG. 13 shows a diagram of the crest factor of a transceiver having the crest factor reduction circuit according to the present invention in comparison with a transceiver without a crest factor reduction circuit.

FIG. 13 shows a crest factor per data symbol without crest factor reduction and when using the crest factor reduction circuit according to the present invention. The method for reducing a crest factor of a multi-tone data signal according to the present invention reduces the crest factor significantly as can be seen from FIG. 13.

LIST OF REFERENCE SIGNS

1 Transceiver
2 Transceiver data input
3 Data Source
4 Transceiver data output
5 Data sink
6 Coding unit
7 IFFT unit
8 Crest factor reduction circuit
9 Transmission signal path
10 Reception signal path
11 Digital filter
12 Digital analogue converter
13 Analogue filter
14 Driving circuit
15 Hybrid circuit
16 Analogue filter
17 Analogue digital converter
18 Digital filter
19 Subtractor
20 Echo compensating means
21 FFT unit
22 Decoding unit
23 First memory
24 Comparator
25 Multiplexer
26 Counter
27 Absolute value calculating unit
28 Shifting unit
29 Second memory
30 Scaling unit
31 Adder
32 Third memory
33 Delay unit
34 Subtractor
35 Convoluting unit
36 Comparator
37 Comparator

What is claimed is:

1. Method for reducing a crest factor of a multi-tone-data signal which is transmitted in a predetermined transmission frequency band ΔF, wherein a multi-tone-correction signal is subtracted from said multi-tone-data signal, said multi-tone correction signal comprising a plurality of tone signals having frequencies outside said transmission frequency band ΔF, and the method comprising the following steps:
   (a) storing in a first memory at least one data symbol of a data symbol sequence, each data symbol comprising a predetermined number of data samples s(i) with index i, $0>=i>=(N-1)$,
   (b) comparing the amplitude of each data sample of said data symbol with a first threshold value to detect a data sample peak;
   (c) performing the following steps when a data sample peak is detected;
      (i) reading a multi-tone-correction signal comprising a corresponding number of correction data samples from a second memory;
      (ii) shifting cyclically the read correction data samples of the multi-tone correction signal so that the maximum of said correction data samples coincides with the detected data sample peak;
      (iii) scaling of the shifted correction data samples of the multi-tone-correction signal according to a predetermined spectrum mask;
      (iv) accumulating the scaled correction data samples of the multi-tone-correction signal in a third memory;
   (d) subtracting the accumulated correction data samples of the multi-tone-correction signal from the data samples of said data symbol.

2. Method according to claim 1, wherein the amplitude of each data sample s(i) of said data symbol is compared with the first threshold value and the corresponding neighboured data samples s(i−m) and s(i+m) are compared with a second threshold value to detect a data sample peak with a high main and a high side amplitude.

3. Method according to claim 2, wherein when a data sample peak with a high main and a high side amplitude is detected at least one single tone-correction signal comprising a tone signal having a frequency within said transmission frequency band ΔF is subtracted from said multi-tone-data signal.

4. Method according to claim 1, wherein the amplitude of each data sample s(i) of said data symbol is compared with a thired threshold value and the corresponding neighboured data samples s(i−m) and s(i+m) are compared with the second threshold value to detect a data sample peak with a very high main and a high side amplitude.

5. Method according to claim 4, wherein when a data sample peak with a very high and a high side amplitude is detected, the multi-tone-correction signal comprising a plurality of tone signals having frequencies outside said transmission frequency band, and at least one signal tone-correction signal comprising a tone signal having a frequency within said transmission frequency band ΔF are subtracted from said multi-tone-data signal.

6. Method according to claim 1, wherein said first threshold value, said second threshold value and said third threshold value are adjusted.

7. Method according to claim 1, wherein that third threshold value is higher than said first threshold value.

8. Method according to claim 1, wherein said second threshold value is lower than said first threshold value.

9. Method according to claim 1, wherein said multi-tone-data signal comprises a plurality of tone-signals having frequencies which are equidistant.

10. Method according to claim 1, wherein said multi-tone-data signal is a DMT (Discrete-Multi-tone Transmission) signal.

11. Method according to claim 1, wherein the multi-tone-data signal is an ADSL-signal.

12. A crest factor reduction circuit for reducing a crest factor of a multi-tone-data signal which is transmitted in a predetermined transmission frequency band ΔF, wherein the crest factor reduction circuit comprises means for subtracting a multi-tone-correction signal from said multi-tone-data signal, wherein the multi-tone-correction signal comprises a plurality of tone signals having frequencies outside said transmission frequency band ΔF, wherein the crest factor reduction circuit has a data input for receiving a data symbol sequence of a data transmission signal, and wherein a first memory is provided for storing at least one data symbol of the received data symbol sequence, each data symbol comprising a predetermined number of data samples.

13. Crest factor reduction circuit according to claim 12, wherein the crest factor reduction circuit comprises a first comparator for comparing the amplitudes of each data sample s(i) of the stored data symbol with a first threshold value to detect a data sample peak.

14. Crest factor reduction circuit according to claim 13, wherein the crest factor reduction circuit comprises a Counter-Modulo-N which controls a multiplexer for switching sequentially the data samples to the first comparator.

15. Crest factor reduction circuit according to claim 12, wherein a delay unit is provided for delaying the received data samples with a predetermined delay time.

16. Crest factor reduction circuit according to claim 12, wherein the crest factor reduction circuit comprises a data output for outputting the corrected data samples as a sequence of corrected data symbols each comprising a predetermined number of corrected data samples.

17. Crest factor reduction circuit according to claim 16, wherein the data output of the crest factor reduction circuit is connected to a transmission signal path comprising:
(a) a digital filter for forming a digital transmission signal,
(b) a digital analog converter for converting the digital transmission signal into an analog transmission signal, and
(c) an analog filter for forming the analog transmission signal and a line driver for amplifying the analog transmission signal.

18. Crest factor reduction circuit according to claim 17, wherein the crest factor reduction circuit further comprises a convoluting unit for convoluting the received data samples with the impulse response of the transmission signal path.

19. Crest factor reduction circuit according to claim 12, wherein the crest factor reduction circuit comprises the first comparator for comparing the amplitudes of each data sample s(i) of the stored data symbol with the first threshold value and further comprises a second comparator for comparing the amplitudes of the corresponding neighboured data samples s(i−m) and s(i+m) with a second threshold value to detect a data sample peak with a high main and a high side amplitude.

20. Crest factor reduction circuit according to claim 12, wherein the crest factor reduction circuit comprises a third comparator for comparing the amplitudes of each data sample s(i) of the stored data symbol with the third threshold value and further comprises the second comparator for comparing the amplitudes of the corresponding neighboured data samples s(i−m) and s(i+m) with the second threshold value to detect a data sample peak with a very high main and a high side amplitude.

21. Crest factor reduction circuit according to claim 19, wherein the single tone-correction signal is read from said second memory and supplied to the shifting unit when the first comparator and the second comparator detect a data sample peak with a high main and a high side amplitude.

22. Crest factor reduction circuit according to claim 19, wherein the multi-tone-correction signal and the single tone-correction signal are read from said second memory and supplied to the shifting unit when the third comparator and the second comparator detect a data sample peak with a very high main and a high side amplitude.

23. Crest factor reduction circuit according to claim 12, wherein the first memory is a RAM (Random Access Memory).

24. A crest factor reduction circuit for reducing a crest factor of a multi-tone-data signal which is transmitted in a predetermined transmission frequency band ΔF, wherein the crest factor reduction circuit comprises means for subtracting a multi-tone-correction signal from said multi-tone-data signal, wherein the multi-tone-correction signal comprises a plurality of tone signals having frequencies outside said transmission frequency band ΔF, and wherein a second memory is provided for storing at least one multi-tone-correction signal comprising correction data samples, wherein the number of correction data samples corresponds to a number of data samples of a data symbol.

25. Crest factor reduction circuit according to claim 24, wherein a shifting unit is provided for shifting the correction data samples read from said second memory so that the maximum of the correction data samples coincides with a detected data sample peak.

26. Crest factor reduction circuit according to claim 25, wherein a scaling unit is provided for scaling the shifted correction data samples according to a predetermined spectrum mask.

27. Crest factor reduction circuit according to claim 26, wherein an accumulating unit is provided for accumulating the scaled correction data samples in a third memory.

28. Crest factor reduction circuit according to claim 27, wherein a subtractor is provided for subtracting the accumulated correction data samples from said data samples of the said received data symbol.

29. Crest factor reduction circuit according to claim 27, wherein the third memory is reset by an overflow signal of said modulo-N-counter.

30. Crest factor reduction circuit according to claim 27, wherein the third memory is a RAM (Random Access Memory).

31. Crest factor reduction circuit according to claim 24, wherein the second memory further stores at least one single tone correction signal, wherein the single tone-correction signal comprises a tone-signal having a frequency within the transmission frequency band.

32. Crest factor reduction circuit according to claim 24, wherein the second memory is a RAM (Random Access Memory).

33. A transceiver for transceiving a data signal comprising:
(a) a coding unit for generating a multi-tone-signal from a received data bit stream;
(b) a IFFT unit for performing an inverse fast fourier transformation to generate a multi-tone-data signal comprising a sequence of data symbols, each having a predetermined number (N) of data samples s(i) with index i, $0 <= i <= (N-1)$;
(c) a crest factor reduction circuit for reducing a crest factor of the multi-tone-data signal which is transmitted in a predetermined transmission frequency band, wherein the crest factor reduction circuit comprises means for subtracting a multi-tone-correction signal from said multi-tone-data signal, wherein the multi-tone-correction signal comprises a plurality of tone signals having frequencies outside said transmission frequency band; and (d) a transmission signal path for forming an analog transmission signal from the corrected multi-tone-data signal.

34. Transceiver according to claim 33, wherein the transmission signal path comprises a digital filter for forming a digital data transmission signal, a digital analog converter for converting the output signal of the digital filter into an analog signal, a analog filter for forming a analog transmission signal and a driving circuit for amplifying the analog transmission signal.

35. Transceiver according to claim 33, wherein the transceiver comprises a reception signal path.

36. Transceiver according to claim 35, wherein the reception signal path comprises an analog filter for limiting the frequency band of a received analog signal, an analog digital converter for converting the received analog signal into a digital signal and a digital filter for forming the received converted digital signal.

37. Transceiver according to claim 33, wherein an echo cancellation unit is provided for compensating echo signals.

38. Transceiver according to claim 37, wherein a subtractor is provided for subtracting the output signal of the echo compensating unit from the output signal of the reception signal path.

39. Transceiver according to claim 38, wherein a FFT-unit is provided for performing a fast fourier transformation of the output signal of the subtractor.

40. Transceiver according to claim 39, wherein a decoding unit is connected to the FFT-unit for performing a multi-tone demodulation.

41. Transceiver according to 33, wherein a hybrid circuit is provided which is connected to the output of the transmission signal path and to the input of the reception signal path.

42. Transceiver according to claim 33, wherein the transceiver is an ADSL-transceiver.

* * * * *